UNITED STATES PATENT OFFICE.

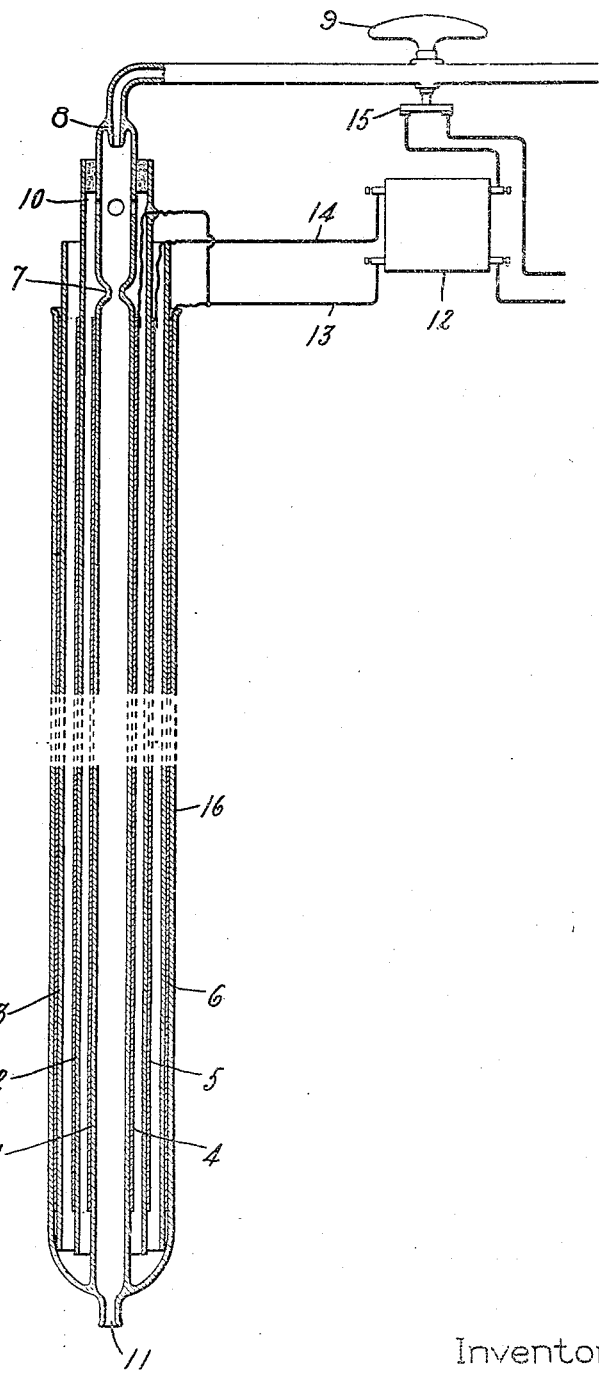

EDWARD P. BECKWITH, OF CAZENOVIA, NEW YORK, ASSIGNOR TO GENERAL ELECTRIC COMPANY, A CORPORATION OF NEW YORK.

STERILIZING.

No. 881,533.      Specification of Letters Patent.      Patented March 10, 1908.

Application filed November 9, 1905. Serial No. 286,499.

*To all whom it may concern:*

Be it known that I, EDWARD P. BECKWITH, a citizen of the United States, residing at Cazenovia, county of Madison, State of New York, have invented certain new and useful Improvements in Sterilizing, of which the following is a specification.

This invention relates to means for purifying or sterilizing water or other liquid with ozone and for treating air to produce ozone for use in sick rooms, hospitals and similar places.

Although my invention is of general application it is intended more particularly to meet the demands for a simple inexpensive sterilizing and purifying apparatus for domestic purposes.

My invention comprises certain novel features of construction and operation hereinafter set forth more in detail and illustrated by means of the drawing forming a part of this specification.

In the drawing, I have shown three concentrically disposed glass tubes 1, 2 and 3 carrying on their outer surfaces the conductors 4, 5 and 6 of aluminium foil. These conductors of aluminium constitute the conductive surfaces between which an electric stress is set up to produce ozone from the air which circulates between the glass tubes. The tubes constitute the dielectrics of the ozonizing apparatus, and although they may be made of various insulating materials instead of glass, I find that glass gives good results, especially glass of the composition known to the trade as German glass. By disposing the dielectrics as concentric cylinders the apparatus is made very compact and furthermore used to good advantage, the cooling action of the air and water under treatment thereby securing a high degree of purification of both air and water with a small expenditure of energy.

By reference to the drawing it will be seen that the inner tube 1 is provided near its top with a constriction 7, and has attached to its extreme upper end a nozzle 8. This nozzle is supplied by water or other fluid under pressure through a suitable controlling valve 9, and projects the water with considerable force against the walls of the constriction 7. The injector action of this stream of water draws air in through a plurality of openings 10 from the space between the inner tube 1 and intermediate tube 2—2, and consequently establishes a circulation of air into the apparatus at the top between tubes 3 and 2, then downward around the lower end of tube 2, and up to the openings 10 previously mentioned. This circulation of air serves to cool the glass tubes and their conductive coatings, and thereby maintains a relatively low temperature in the generating chambers, thus maintaining a high efficiency in the conversion of air into ozone. Inner tube 1 and its coating 4 are not only cooled by the circulating air, but are also cooled by the mixture of air and water which passes downward through the tube and leaves the apparatus through orifice 11. This mixture of air and water becomes intimately commingled at the constriction 7 and in its passage through tube 1, so that the water under treatment and the air with which it is mixed are both thoroughly impregnated with the ozone and thereby purified of substantially all noxious germs and spores, thus rendering them pure and healthful.

The necessary electrical stress between the various coatings 4, 5 and 6 may be established in any convenient way, but I prefer to use a transformer 12, receiving energy from a suitable source and delivering high potential alternating-current to the three coatings. One terminal 13 of this transformer is connected to both the coatings 6 and 4, while the other terminal 14 is connected to the intermediate conductor 5, thus establishing two distinct paths for high potential discharge through the apparatus; one between the intermediate conductor 5 and the outer conductor 6, and the other between the intermediate conductor and the inner conductor 4. In order that the apparatus may be as automatic as possible, I attach a suitable switch 15 to the water supply valve 9, so that when the water is turned on the transformer primary will be energized, but when current is turned off the primary circuit will be interrupted.

As a means for supporting the outer tube 3 and its metal coating and for insulating these parts from surrounding objects, I inclose them in an outer tube or envelop 16, which tapers inwardly at its lower end, and is fused or otherwise connected to tube 1 just above the outlet.

What I claim as new, and desire to secure by Letters Patent, of the United States, is,—

1. In a sterilizing apparatus, a fluid supply, an ozone generating chamber, and means for utilizing the flow of fluid in said apparatus to cool said ozone generating chamber and to produce a circulation of air therein.

2. In a sterilizing apparatus, a plurality of conducting surfaces separated by dielectric material, means for establishing an electric stress between said surfaces, means for cooling one of said surfaces with a flowing liquid, and means for utilizing said flowing liquid to circulate a gaseous cooling medium in proximity to another of said surfaces.

3. In a sterilizing apparatus, a plurality of concentric cylindrical conductors, means for establishing an electric stress between said conductors to produce ozone, means for supplying a liquid to the innermost of said conductors and means for permitting said ozone to contact with said liquid.

4. The combination of a plurality of concentric insulating tubes, a conductive coating for each of said tubes, means for establishing an electric stress between said coatings to produce ozone, and means for supplying a cooling liquid to the innermost tube, said tube having openings through which said ozone is entrained to purify said liquid.

5. In a fluid purifying apparatus, a mixing chamber, means for supplying fluid thereto to be purified, an ozone generating chamber surrounding said mixing chamber and communicating therewith, the walls of said mixing chamber forming a constriction in the path of said water to effect a circulation of air through said ozone chamber.

6. The combination of three concentric tubes of insulating material spaced apart to form air spaces therebetween, a conducting coating for each of said tubes, means for establishing an electric stress between one of said coatings and the other two, and means for circulating a liquid within the innermost of said tubes to cool said tube and effect a circulation of air through said ozone chamber.

7. In a sterilizing apparatus, a plurality of conducting surfaces, means for establishing an electric stress between said conductors to produce ozone, and means for establishing a jet of liquid within said apparatus to produce a circulation of air between said conductors.

In witness whereof, I have hereunto set my hand this 8th day of November, 1905.

EDWARD P. BECKWITH.

Witnesses:
BENJAMIN B. HULL,
HELENA SHIELDS.